US012603588B2

(12) United States Patent
Huang et al.

(10) Patent No.: US 12,603,588 B2
(45) Date of Patent: Apr. 14, 2026

(54) CONTROL CIRCUIT AND METHOD FOR DC MOTORS

(71) Applicant: Intex Marketing Ltd., Tortola (VG)

(72) Inventors: Zhi Xiong Huang, Fujian (CN); Ying Biao Zhang, Fujian (CN)

(73) Assignee: Intex Marketing Ltd., Tortola (VG)

( * ) Notice: Subject to any disclaimer, the term of this patent is extended or adjusted under 35 U.S.C. 154(b) by 19 days.

(21) Appl. No.: 18/267,659

(22) PCT Filed: Dec. 16, 2021

(86) PCT No.: PCT/IB2021/061865
§ 371 (c)(1),
(2) Date: Jun. 15, 2023

(87) PCT Pub. No.: WO2022/130283
PCT Pub. Date: Jun. 23, 2022

(65) Prior Publication Data
US 2024/0056002 A1 Feb. 15, 2024

(30) Foreign Application Priority Data

Dec. 16, 2020 (CN) .......................... 202011488531.1

(51) Int. Cl.
*H02P 1/02* (2006.01)
*H02P 1/18* (2006.01)
(Continued)

(52) U.S. Cl.
CPC ................ *H02P 1/021* (2013.01); *H02P 1/18* (2013.01); *H02P 7/29* (2013.01); *H02P 29/027* (2013.01)

(58) Field of Classification Search
CPC .... H02P 1/021; H02P 1/18; H02P 7/29; H02P 29/027; H02P 6/20
(Continued)

(56) References Cited

U.S. PATENT DOCUMENTS 4,873,453 A 10/1989 Schmerda
5,963,005 A * 10/1999 Yamaji ...................... H02P 8/14
318/705
(Continued)

FOREIGN PATENT DOCUMENTS

CN 1679227 10/2005
CN 102480228 5/2012
(Continued)

OTHER PUBLICATIONS

International Search Report and Written Opinion as issued by the International Searching Authority, dated Feb. 18, 2022, for International Patent Application No. PCT/IB2021/061865; 9 pages.
(Continued)

*Primary Examiner* — David Luo
(74) *Attorney, Agent, or Firm* — Faegre Drinker Biddle & Reath LLP

(57) ABSTRACT

A control circuit and method for DC motors is disclosed in the present application. The control circuit may comprise a voltage monitoring unit for monitoring the output voltage of the DC power supply, a switching circuit for controlling the operation of the DC motor, and a PWM signal output unit to output PWM signal for controlling the switching circuit. The PWM signal output unit may be configured to regulate the duty cycle of the output PWM signal based on the results of the voltage monitoring unit. In this way, motors with different resistances may work continuously in a stabilized state. Also, it may detect when a load like motor is heavy loaded or overloaded, stop motor from starting, and avoid overtime working due to the drop of supply voltage damaging the load like motor. When the voltage of power supply is higher than the rated voltage of the motor, it may regulate the input voltage value of power supply to avoid the increase
(Continued)

of excitation current of motor with the increase of the applied voltage, thereby avoid the loss of iron core.

10 Claims, 3 Drawing Sheets

(51) Int. Cl.
*H02P 7/29* (2016.01)
*H02P 29/024* (2016.01)
(58) Field of Classification Search
USPC .......................... 318/811, 810, 807, 767, 727
See application file for complete search history.

(56) References Cited

U.S. PATENT DOCUMENTS

| | | | | | |
|---|---|---|---|---|---|
| 6,696,812 | B2 * | 2/2004 | Kaneko | .................... | H02P 21/04 |
| | | | | | 318/722 |
| 6,801,009 | B2 * | 10/2004 | Makaran | ................. | H02P 29/02 |
| | | | | | 388/903 |
| 7,133,601 | B2 * | 11/2006 | Phillips | .................... | H02P 29/02 |
| | | | | | 318/599 |
| 7,509,032 | B2 * | 3/2009 | Jami | ......................... | H02P 6/10 |
| | | | | | 388/811 |
| 8,350,504 | B2 * | 1/2013 | Lee | ........................... | H02P 6/18 |
| | | | | | 318/400.01 |
| 2004/0179829 | A1 | 9/2004 | Phillips | | |
| 2012/0242259 | A1 | 9/2012 | Funabashi | | |

FOREIGN PATENT DOCUMENTS

| | | | | |
|---|---|---|---|---|
| CN | 102497143 | 6/2012 | | |
| CN | 104010415 | 8/2014 | | |
| CN | 104467546 | 3/2015 | | |
| CN | 210669924 | 6/2020 | | |
| EP | 1039623 | 9/2000 | | |
| EP | 2853353 B1 * | 10/2017 | ............... | H02P 1/16 |

OTHER PUBLICATIONS

International Preliminary Report on Patentability as issued by the International Searching Authority, dated Feb. 14, 2023, for International Patent Application No. PCT/IB2021/061865; 14 pages.

Communication pursuant to Article 94(3) EPC issued by the European Patent Office, dated Jun. 14, 2024, for European Patent Application No. 21834918.1; 6 pages.

English translation of First Office Action as issued by The State Intellectual Property Office of People's Republic of China, dated Mar. 20, 2025, for Chinese Application No. 202011488531.1; 5 pages.

First Office Action as issued by The State Intellectual Property Office of People's Republic of China, dated Mar. 20, 2025, for Chinese Application No. 202011488531.1; 7 pages.

Search Report as issued by The State Intellectual Property Office of People's Republic of China, dated Mar. 20, 2025, for Chinese Application No. 2020114885311; 2 pages.

* cited by examiner

CONTROL CIRCUIT AND METHOD FOR DC MOTORS

RELATED APPLICATIONS

The present application is a national stage entry of International (PCT) Patent Application Number PCT/IB2021/061865, filed Dec. 16, 2021, which claims priority to Chinese Application No. CN202011488531.1, filed Dec. 16, 2020, the entire disclosures of which are expressly incorporated by reference herein.

RELATED APPLICATION

This application is related to Chinese Patent Application No. CN202011488531.1, filed Dec. 16, 2020, the entire disclosure of which is expressly incorporated by reference herein.

TECHNICAL FIELD

The present application relates to the field of intelligent control technology and, more particularly, to a control circuit and method for DC motors.

BACKGROUND ART

Due to the limited load capacity of DC power supply, the output voltage of DC power supply will drop significantly when it is heavy loaded or overloaded, which will have a significant impact on the load. When the supply voltage drops, the rotary torque of the motor will be greatly reduced. If the load remains constant, the current of the motor must be greatly increased to produce the required torque. If the required torque exceeds the motor's limit, the motor may be overloaded and damaged. If the voltage is too low for a long time, the motor will burn out due to the heat.

During the starting process of motor, when the voltage of power supply is lower than the rated voltage of the motor, the magnetic field induced by the rotor will weaken the rated voltage of the motor, thereby weakening the induced magnetic field rotor winding current and rotating magnetic field of the motor. Reduction of the two aspects leads to great reduction of torque, even makes it difficult or unable to start in extreme conditions. During normal operation, when the voltage is reduced, the speed of the motor will slow down due to the reduction of torque and constant load. This will accelerate the speed of cutting the rotor winding magnetic lines, and increase the induced current and stator current, leading to over-current operation occasionally, the motor overheated for a long time and even burn out. When the voltage of power supply is higher than the rated voltage of the motor, the excitation current of the motor increase with the increase of the applied voltage, which will increase the loss of iron core, reduce the power factor of the motor, and affect the operation of the motor.

In the prior art, the detection circuit of the supply voltage of the DC motor has a complex structure and high cost. It mainly plays the role of collecting the supply voltage for the calculation of other voltages, and hence does not play the role of voltage regulation and stabilization. Moreover, the problem still remains that the motor is damaged due to the change of the supply voltage during the starting and working of the motor.

SUMMARY

In order to solve the technical problem in the prior art that the supply voltage of DC motor does not play the role of voltage regulation and stabilization and the motor damaged due to the change of the supply voltage during the starting and working of the motor, and/or other problems with the prior art, the present application proposes a control circuit and method for DC motors to solve the above technical problems.

In an exemplary embodiment of the present application, a control circuit for a DC motor is provided. The DC motor is connected to a DC power supply. The control circuit may comprise a voltage monitoring unit for monitoring output voltage of the DC power supply, a switching circuit for controlling operation of said DC motor, and a PWM signal output unit for outputting PWM signal to control said switching circuit. The PWM signal output unit is configured to regulate duty cycle of the output PWM signal based on output results of said voltage monitoring unit.

In an example thereof, the control circuit may further include a current monitoring unit. The current monitoring unit may monitor an output current of said DC power supply. The PWM signal output unit is configured to regulate duty cycle of the output PWM signal based on output results of said voltage monitoring unit and said current monitoring unit.

In another example thereof, said switching circuit comprises a transistor switch. The PWM signal outputted by said PWM signal output unit may be inputted to a control terminal of the transistor switch.

In a further example thereof, said PWM signal output unit is configured to, when an output voltage of said DC power supply is detected higher than a first set voltage, gradually increase said duty cycle of the PWM signal and synchronously collect the current value monitored by said current monitoring unit; when an output voltage of said DC power supply is detected equal to or lower than the first set voltage and higher than a second set voltage, determine that said DC motor has started, save the PWM value at that moment, synchronously collect the current value monitored by said current monitoring unit, and then enter a maximum power control mode.

In yet another example, in an maximum power control mode, the PWM signal duty cycle of said PWM signal output unit is regulated in real time to keep the output voltage of said DC power supply constant at a third set voltage value; if said PWM signal output unit continuously detects an output voltage of said DC power supply unable to be constant at the third set voltage value and lower than the second set voltage value in the meantime, the DC power supply is determined to have insufficient load capacity and said PWM signal output unit stops outputting signal.

In still another example, said first set voltage is the difference between a static voltage and a voltage difference, said static voltage is a voltage value of the DC power supply recorded in real-time when the motor stops working, and the range of said voltage difference is 0.1V-1V.

In yet still a further example, said first set voltage and said third set voltage are higher than said second set voltage respectively.

In yet a further still example, said voltage monitoring unit comprises a voltage divider circuit and a first A/D sampling circuit, said voltage divider circuit is provided with an electric potential testing point, and said first A/D sampling circuit collects the voltage value of said electric potential testing point.

In a further yet example, said current monitoring unit comprises a sampling resistor and a second A/D sampling circuit, said second A/D sampling circuit collects the value of current flowing through said sampling resistor.

In another exemplary embodiment of the present disclosure, a control method for a DC motor is provided. The control method may include one or more of the disclosed features presented herein.

In one aspect, the present application proposes a control circuit for DC motor comprising the following: a DC power supply, a connecting DC motor; and a control circuit. The control circuit comprising a voltage monitoring unit for monitoring the output voltage of the DC power supply, a switching circuit for controlling the operation of the DC motor, and a PWM signal output unit to output a PWM signal for controlling the switching circuit. The PWM signal output unit is configured to regulate the duty cycle of the output PWM signal based on the results of the voltage monitoring unit. The PWM signal output unit regulates the output voltage of the DC power supply according to the value of the power supply voltage collected from the voltage monitoring unit, and stabilizes the output voltage of the DC power supply at the set voltage value.

Further, in embodiments, a current monitoring unit for monitoring the output current of the DC power supply is provided. The PWM signal output unit is configured to regulate the duty cycle of the output PWM signal based on the results of the voltage monitoring unit and current monitoring unit. The PWM signal output unit regulates the output voltage of the DC power supply according to the value of the power supply voltage collected from the voltage monitoring unit, and stabilizes the output voltage of the DC power supply at the set voltage value. The current monitoring unit monitors in real time, and the PWM signal output unit determines the maximum output power of the motor according to the collected voltage value and current value, to keep the motor always in the maximum power operation mode.

Further, in embodiments, the switching circuit comprises a transistor switch. The PWM signal outputted by the PWM signal output unit is inputted to the control terminal of the transistor switch. The PWM signal output unit outputs the PWM signal, by controlling the cut-off frequency of the transistor switch, the magnitude of the current and voltage in the circuit is in control.

Further, in embodiments, the PWM signal output unit is configured as that, when it detects an output voltage of the DC power supply higher than a first set voltage, it will gradually increase the duty cycle of the PWM signal and synchronously collect the current value monitored by the current monitoring unit. When it detects an output voltage of the DC power supply equal to or lower than the first set voltage and higher than a second set voltage, it will conclude that the DC motor starting is completed, save the PWM value at that moment, synchronously collect the current value monitored by the current monitoring unit, and then enter a maximum power control mode. A voltage value range is set, in which motors of different resistance values can start. When the voltage of the power supply is detected to be lower than this range, it will conclude that the supply voltage is significantly pulled down due to overloading, and stop the motor from starting, and thereby play a role of protecting the loads like motors.

Further, in embodiments while in the maximum power control mode, the PWM signal duty cycle of the PWM signal output unit is regulated in real time to keep the output voltage of the DC power supply constant at a third set voltage value, If the PWM signal output unit continuously detects an output voltage of the DC power supply to be unable to be constant at the third set voltage value and lower than the second set voltage value meanwhile, it will conclude that the power supply has insufficient load capacity, at which time the PWM signal output unit stops outputting signals. The PWM signal output unit calculates the third set voltage at the maximum power output by collecting the values of voltage and current in the circuit, and makes the motor work at the third set voltage of the maximum power.

Further, in embodiments, the first set voltage is the difference between static voltage and voltage difference, the static voltage is the DC power supply voltage value recorded in real-time when the motor stops working, and the voltage difference falls all in the range of 0.1V-1V.

Further, in embodiments, the first set voltage and the third set voltage are higher than the second set voltage, respectively.

Further, in embodiments, the voltage monitoring unit comprises a voltage divider circuit and a first A/D sampling circuit. The voltage divider circuit is provided with an electric potential testing point, and the first A/D sampling circuit collects the voltage value of the electric potential testing point. The voltage value collected by the first A/D sampling circuit is transmitted to the PWM signal output unit, and the PWM signal output unit calculates the voltage value of the power supply voltage by calculating the voltage of the electric potential testing point.

Further, in embodiments, the current monitoring unit comprises a sampling resistor and a second A/D sampling circuit. The second A/D sampling circuit collects the value of current flowing through the sampling resistor. The value of current in the circuit is obtained by collecting the value of current flowing through the sampling resistor.

According to a second aspect of the present application, a control method for DC motor is proposed, the method comprises: controlling the operation of DC motor using the control circuit for DC motor proposed in the first aspect.

The present application in embodiments, proposes a control circuit and method for DC motor. The control circuit comprises, a DC power supply, a connecting DC motor; and a control circuit, comprising a voltage monitoring unit for monitoring the output voltage of the DC power supply, a switching circuit, for controlling the operation of the DC motor, and a PWM signal output unit, to output PWM signal for controlling the switching circuit. The PWM signal output unit is configured to regulate the duty cycle of the output PWM signal based on the results of the voltage monitoring unit. Advantages, among others, include that motors with different resistances can work continuously in a stabilized state. Also, it can detect when a load like motor is heavy loaded or overloaded, stop motor from starting, and avoid overtime working due to the drop of supply voltage damaging the load like motor. When the voltage of power supply is higher than the rated voltage of the motor, it will regulate the input voltage value of power supply to avoid the increase of excitation current of motor with the increase of the applied voltage, thereby avoid the loss of iron core.

BRIEF DESCRIPTION OF DRAWINGS

The accompanying drawings are included to provide a further understanding of the embodiments. The accompanying drawings illustrate embodiments and are used in conjunction with the description to explain the principles of the application. Many of the anticipated advantages of embodiments will be better recognized, as they become better understood by reference to the following detailed description. Other features, objects and advantages of the present application will become more apparent by reading the detailed description of the non-limiting embodiments made with reference to the following accompanying drawings.

DETAILED DESCRIPTION OF EMBODIMENTS

The present application is described in further detail below with the accompanying drawings and embodiments. It's understood that the specific embodiments described herein are intended only to explain the present application and not to limit it. It is also to be noted that, for ease of description, only those portions related to the application are shown in the accompanying drawings.

The terms used in the present application are for the purpose of describing particular embodiments only, and are not intended to limit the application. The singular forms of "a", "said" and "the" as used in the present application and the appended claims are also intended to include most forms unless the context clearly indicates other meaning. It should also be understood that the term "and/or" as used herein refers to and includes any or all possible combinations of one or more associated listed items.

It should be understood that while the terms first, second, third, etc. may be employed in the present application to describe various kinds of information, such information should not be limited to these terms. These terms are used only to distinguish information of the same type from one another. For example, without departing from the scope of the present application, a first message may also be referred to as a second message, and similarly, a second message may be referred to as a first message. Depending on the context, for example, the word "if" as used herein may be interpreted as "at" or "when" or "in response to a determination".

Embodiment 1

Figure 1:
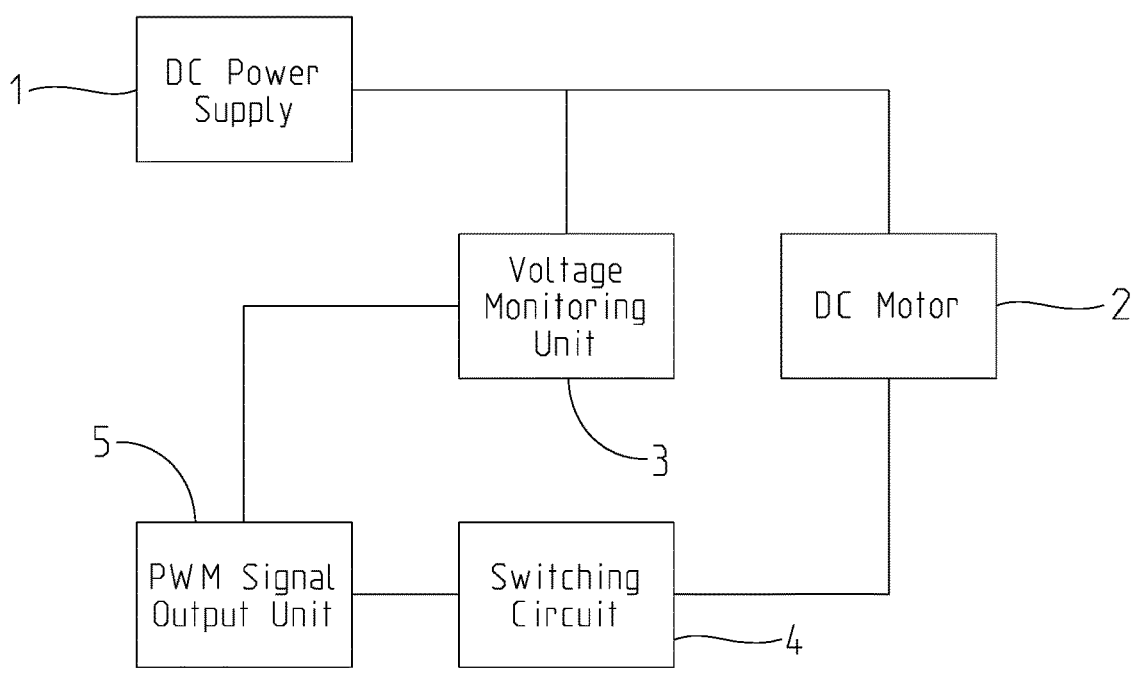
FIG. 1 is a schematic diagram of an exemplary module connection of a control circuit for DC motor in the first embodiment of the present application.

As shown in FIG. 1, DC motor 2 is connected to DC power supply 1, control circuit comprises voltage monitoring unit 3 for monitoring the output voltage of the DC power supply 1, switching circuit 4 for controlling the operation of the DC motor 2, and PWM signal output unit 5 to output PWM signal for controlling the switching circuit 4, the PWM signal output unit 5 is configured to regulate the duty cycle of the output PWM signal based on the results of the voltage monitoring unit 3. The PWM signal output unit 5 regulates the output voltage of the DC power supply according to the value of the power supply voltage collected from the voltage monitoring unit 3, and stabilizes the output voltage of the DC power supply 1 at the set voltage value.

Figure 2:
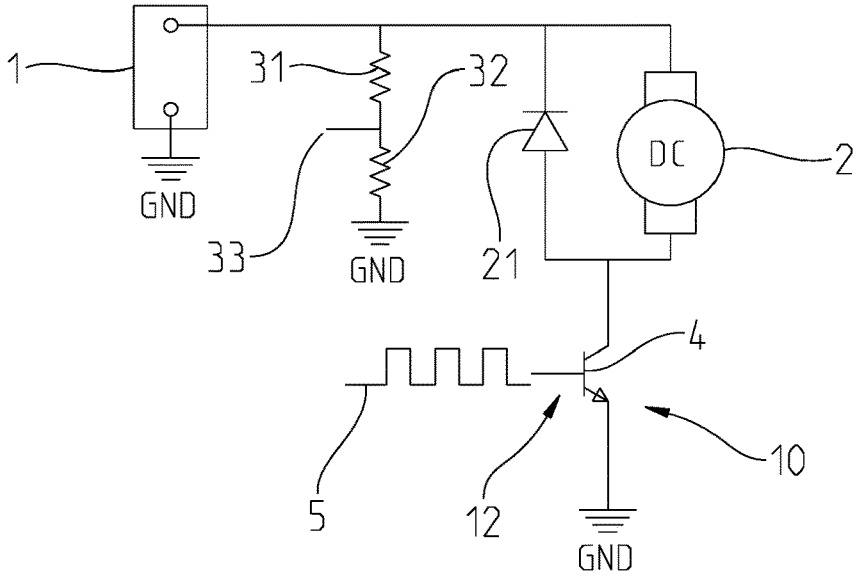
FIG. 2 is a schematic diagram of an exemplary specific circuit of a control circuit for DC motor in the first embodiment of the present application.

As shown in FIG. 2, the switching circuit 4 comprises a transistor switch 10, which can be a bipolar transistor BJT, and the PWM signal outputted by the PWM signal output unit 5 is inputted to the control terminal 12 of the transistor switch 10. The PWM signal output unit 5 outputs the PWM signal, by controlling the cut-off frequency of the transistor switch, the magnitude of the current and voltage in the circuit is in control. Renewal diode 21 in the circuit, which can be fast recovery diode or Schottky diode, is parallelly connected to the DC motor 2, to protect the motor from breakdown or burnout by the induced voltage. The renewal diode 21 eliminates reverse voltage protection in the DC circuit caused by sudden changes of voltage and current at the terminals of the inductive load.

In specific embodiments, the voltage monitoring unit 3 comprises a voltage divider circuit and a first A/D sampling circuit 33, wherein the voltage divider circuit comprises a first resistor 31 and a second resistor 32. The voltage divider circuit and the power supply constitute a complete circuit, the voltage divider circuit is connected in parallel with the load circuit, one terminal of the second resistor 32 is connected in series with the first resistor 31, and the other terminal of the second resistor 32 is connected to the signal ground. The potential point of the second resistor 32 relative to the signal ground can be taken as test potential point. The voltage value collected by the first A/D sampling circuit 33 is transmitted to the PWM signal output unit 5, an MCU control chip, comprised by the PWM signal output unit 5, calculates the voltage value of the power supply based on the voltage of the test potential point.

In specific embodiments, the PWM signal output unit 5 is configured as that, when it detects an output voltage of the DC power supply 1 higher than a first set voltage, it will gradually increase the duty cycle of the PWM signal; when it detects an output voltage of the DC power supply equal to or lower than the first set voltage, it will conclude that the DC motor starting is completed, save the PWM value at that moment. Here, the PWM signal output unit 5 can output PWM signal by a digitally controlled analog circuit, or by built-in microcontroller controlled by PWM. The voltage or current source is added to the transistor switch in the switching circuit 4 in a repetitive pulse sequence of on or off. It is on when the DC power supply is applied to the load, off when the power supply is removed. Therefore, the duty cycle of the high level in the PWM waveform can be used to control the switching off of the transistor switch, thus controlling the current and voltage of the circuit.

Thereby, in embodiment 1, the principle of the PWM signal output unit 5 controlling the circuit voltage and stabilizing it is that, first, pre-setting a first set voltage in the MCU. Starting from N %, the motor increases the duty cycle by 1% every×ms until M %, meanwhile the voltage value of power supply is monitored. During starting, if the voltage value of power supply is detected to be lower than the first set voltage, the motor stops increasing the duty cycle, the overloaded point is confirmed, the present current value and voltage value of power supply are recorded, and the starting is completed. If the voltage value of power supply is detected to be higher than or equal to the first set voltage over the starting, the duty cycle is increased to M %, the present voltage value of power supply is recorded, and the starting is completed. And, the power supply voltage value is being detected in real time over starting process to determine whether the motor is blocked or short-circuited, and if it is blocked or short-circuited, the exception code is outputted and an anomaly processing is engaged.

Embodiment 2

Embodiment 2 differs from embodiment 1 in that, current monitoring unit 6 is added, the PWM signal output unit 5 can calculate the maximum output power of loaded operation based on the values collected from the current monitoring unit 6 and the voltage monitoring unit 3, and can keep the motor 2 in the maximum power operation mode by regulating the voltage and current magnitude in the circuit.

Figure 3:
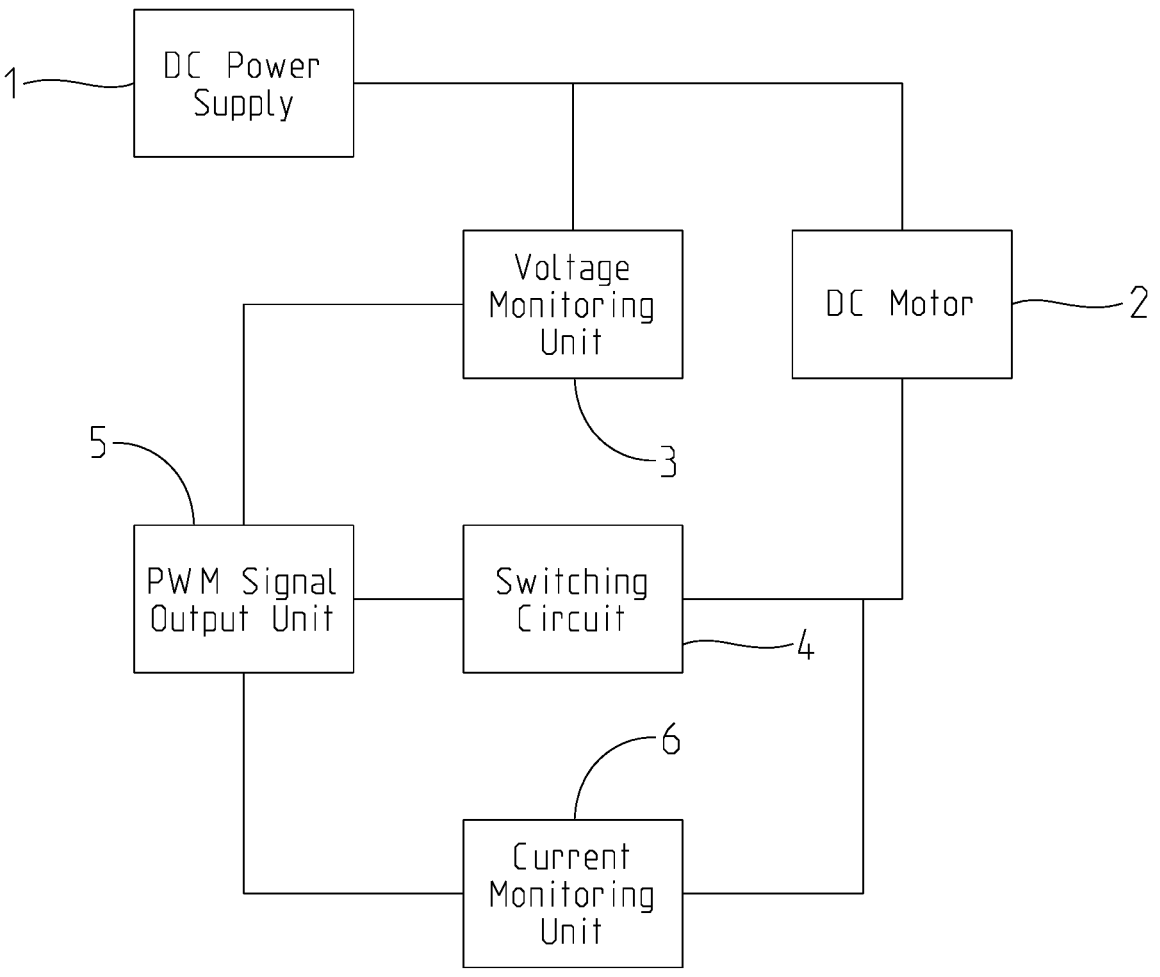
FIG. 3 is a schematic diagram of an exemplary module connection of a control circuit for DC motor in the second embodiment of the present application.

As shown in FIG. 3, in specific embodiments, a current monitoring unit 6 is comprised for monitoring the output current of the DC power supply 1, and the PWM signal output unit 5 is configured to regulate the duty cycle of the PWM signal output according to the results of the voltage monitoring unit 3 and the current monitoring unit 6. The PWM signal output unit 5 regulates the output voltage of the DC power supply 1 according to the value of the power supply voltage collected from the voltage monitoring unit 3, and stabilizes the output voltage of the DC power supply 1 at the set voltage value. The current monitoring unit 6 monitors in real time, and the PWM signal output unit 5 determines the maximum output power of the motor according to the collected voltage value and current value, so as to keep the motor in the maximum power operation mode.

Figure 4:
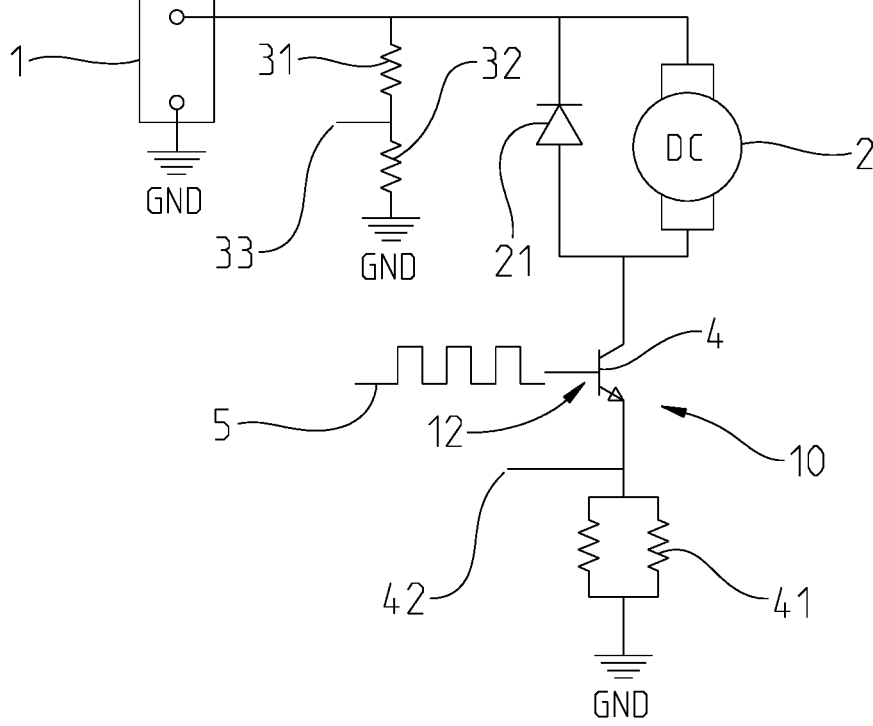
FIG. 4 is a schematic diagram of an exemplary specific circuit of a control circuit for DC motor in the second embodiment of the present application.

As shown in FIG. 4, in specific embodiments, the current monitoring unit 6 comprises a sampling resistor 41 and a second A/D sampling circuit 42. The second A/D sampling circuit 42 collects the value of current flowing through the sampling resistor 41, thereby gets the value of current in the circuit. The sampling resistor 41 gets corresponding resistance value according to the parallel and series result, and voltage value measured from both terminals, then calculates the current value in the circuit.

Thereby, in embodiment 2, the principle of the PWM signal output unit 5 controlling the circuit voltage and stabilizing it is that, the PWM signal output unit 5 is configured as that, when an output voltage of the DC power supply 1 is detected higher than a first set voltage, it will gradually increase the duty cycle of the PWM signal. When an output voltage of the DC power supply is detected equal to or lower than the first set voltage and meanwhile higher than the second set voltage, it will conclude that the DC motor starting is completed, save the PWM value at that moment.

In specific embodiments, in the maximum power control mode, the PWM signal duty cycle of the PWM signal output unit 5 is regulated in real time to keep the output voltage of the DC power supply 1 constant at a third set voltage value. If the PWM signal output unit 5 continuously detects an output voltage of the DC power supply 1 to be unable to be constant at the third set voltage value and lower than the second set voltage value meanwhile, the PWM signal output unit 5 will conclude that the power supply has insufficient load capacity, at which time the PWM signal output unit 5 stops outputting signals. The PWM signal output unit 5 calculates the third set voltage at the maximum power output by collecting the values of voltage and current in the circuit, and makes the motor work at the third set voltage of the maximum power.

In specific embodiments, the first set voltage is the difference between static voltage and voltage difference, the static voltage is the voltage value of DC power supply 1 recorded in real-time when the motor stops working. In engineering field, the voltage difference is preferred to fall in the range of 0.1V-1V.

The current value is being detected in real time over starting process to determine whether the motor is blocked or short-circuited, and if it is blocked or short-circuited, the exception code is outputted and an anomaly processing is engaged.

The maximum output power operation mode includes after the system completed starting, according to different load conditions and different power supply capacity, by regulating the ratio of duty cycle, the voltage of the input power supply is stabilized at the third set voltage, where the first set voltage and the third set voltage are greater than second set voltage respectively. Meanwhile, the load current is being monitored to keep the system at the maximum output power. Meanwhile, the continuous working time is being monitored, when the system has been working over x minutes, the exception code is outputted and an anomaly processing is engaged.

Anomaly processing includes: (1) When the motor is detected blocked or short circuit, the duty cycle is immediately cleared and the motor is turned off; (2) When the motor is detected having been working continuously over time, the duty cycle is immediately cleared and the motor is turned off; and (3) When the motor is detected to have insufficient load capacity, the duty cycle is immediately cleared and the motor is turned off.

The so-called voltage stabilized state allows the voltage to fluctuate within the set allowable voltage range, the set allowable voltage range is also known as safe voltage. The system can work within the safe voltage range by monitoring the supply voltage and regulating its value, or by monitoring the circuit current and regulating its value. Also, by monitoring the power supply voltage, the system is working in the set allowable voltage range, then by collecting the circuit current, PMW signal output unit calculate and regulate the current to keep the system work in the maximum power mode in the set allowable voltage range.

Meanings of markings in the drawings are:
1—DC power supply;
10—Transistor switch
12—Control terminal
2—DC motor;
21—Continuity diode;
3—Voltage monitoring unit;
31—First resistor;
32—Second resistor;
33—First A/D sampling circuit;
4—Switching circuit;
41—Sampling resistor;
42—Second A/D sampling circuit;
5—PWM signal output unit;
6—Current monitoring unit.

The above descriptions are only preferred embodiments of the present application and the technical principles applied. It should be understood by those skilled in the art that the scope of the application covered by the present application is not limited to the technical solution resulting from a particular combination of the above technical features, but should also cover other technical solutions resulting from any combination of the above technical features or their equivalent features without departing from the above inventive concept. For example, the technical solutions formed by replacing the above features with the technical features with similar functions disclosed in this application (but not limited to).

The invention claimed is:

1. A control circuit for a DC motor, wherein the DC motor is connected to a DC power supply, the control circuit comprising:

a voltage monitoring unit for monitoring an output voltage of the DC power supply;

a switching circuit for controlling operation of the DC motor; and a PWM signal output unit for outputting a PWM signal to control the switching circuit, wherein the PWM signal output unit is configured to regulate a duty cycle of the PWM signal by increasing the duty cycle when the output voltage of the DC power supply is detected to be higher than a first set voltage and stop increasing the duty cycle when the output voltage of the DC power supply is detected to be lower than the first set voltage.

2. The control circuit of claim 1, further comprising:

a current monitoring unit for monitoring an output current of the DC power supply; and wherein the PWM signal output unit is configured to regulate the duty cycle of the PWM signal based on output results of the voltage monitoring unit and the current monitoring unit.

3. The control circuit of claim 2, wherein the PWM signal output unit is configured to:

when the output voltage of the DC power supply is detected to be higher than the first set voltage, gradually increase the duty cycle of the PWM signal and synchronously collect the output current monitored by the current monitoring unit;

when the output voltage of the DC power supply is detected to be equal to or lower than the first set voltage and higher than a second set voltage, determine that the DC motor has started, save the PWM value, synchronously collect the output current monitored by the current monitoring unit, and enter into a maximum power control mode.

4. The control circuit of claim 3, wherein in the maximum power control mode:

the duty cycle is regulated in real time to keep the output voltage of the DC power supply constant at a third set voltage; and if the PWM signal output unit continuously detects the output voltage of the DC power supply as unable to be constant at the third set voltage and lower than the second set voltage, the DC power supply is determined to have insufficient load capacity and the PWM signal output unit stops outputting the PWM signal.

5. The control circuit of claim 4, wherein the first set voltage is the difference between a static voltage and a voltage difference, the static voltage being a voltage value of the DC power supply recorded in real-time when the DC motor stops working and a range of the voltage difference is between 0.1V-1V.

6. The control circuit of claim 5, wherein the first set voltage and the third set voltage are higher than the second set voltage respectively.

7. The control circuit of claim 2, wherein the current monitoring unit comprises a sampling resistor and a second A/D sampling circuit, the second A/D sampling circuit collecting the value of current flowing through the sampling resistor.

8. The control circuit of claim 1, wherein the switching circuit comprises a transistor switch, and the PWM signal outputted by the PWM signal output unit is inputted to a control terminal of the transistor switch.

9. The control circuit of claim 1, wherein the voltage monitoring unit comprises a voltage divider circuit and a first A/D sampling circuit, the voltage divider circuit being provided with an electric potential testing point, and the first A/D sampling circuit collecting the voltage value of the electric potential testing point.

10. A control method for the DC motor, wherein the method uses the control circuit for the DC motor according to claim 1 to control the operation of the DC motor.

* * * * *